(12) United States Patent
Fink et al.

(10) Patent No.: US 7,734,063 B2
(45) Date of Patent: Jun. 8, 2010

(54) MULTI-AGENT AUTONOMOUS SYSTEM

(75) Inventors: Wolfgang Fink, Montrose, CA (US); James Dohm, Chandler, AZ (US); Mark A. Tarbell, Walnut, CA (US)

(73) Assignee: California Institute of Technology, Pasadena, CA (US)

( * ) Notice: Subject to any disclaimer, the term of this patent is extended or adjusted under 35 U.S.C. 154(b) by 521 days.

(21) Appl. No.: 11/261,549

(22) Filed: Oct. 28, 2005

(65) Prior Publication Data

US 2006/0064286 A1    Mar. 23, 2006

Related U.S. Application Data

(62) Division of application No. 10/625,834, filed on Jul. 22, 2003, now Pat. No. 6,990,406.

(60) Provisional application No. 60/398,052, filed on Jul. 22, 2002, provisional application No. 60/473,726, filed on May 28, 2003.

(51) Int. Cl.
*G06K 9/00* (2006.01)
*H04N 7/18* (2006.01)

(52) U.S. Cl. ............... 382/103; 382/218; 348/113; 348/143

(58) Field of Classification Search .......... 382/218, 382/103–105; 348/113–124, 143–159
See application file for complete search history.

(56) References Cited

U.S. PATENT DOCUMENTS 4,706,120 A * 11/1987 Slaughter et al. ........... 348/114
4,887,223 A    12/1989 Christian (Continued)

FOREIGN PATENT DOCUMENTS

JP    11-305360    11/1999

OTHER PUBLICATIONS

Nakamura et al.; Multiple mobile robot operation by human; May 1998; Intl. Conf. On Robotics and Automation, 1998; vol. 4, pp. 2852-2857.

(Continued)

*Primary Examiner*—Aaron W Carter
(74) *Attorney, Agent, or Firm*—Christie, Parker & Hale, LLP

(57) ABSTRACT

A multi-agent autonomous system for exploration of hazardous or inaccessible locations. The multi-agent autonomous system includes simple surface-based agents or craft controlled by an airborne tracking and command system. The airborne tracking and command system includes an instrument suite used to image an operational area and any craft deployed within the operational area. The image data is used to identify the craft, targets for exploration, and obstacles in the operational area. The tracking and command system determines paths for the surface-based craft using the identified targets and obstacles and commands the craft using simple movement commands to move through the operational area to the targets while avoiding the obstacles. Each craft includes its own instrument suite to collect information about the operational area that is transmitted back to the tracking and command system. The tracking and command system may be further coupled to a satellite system to provide additional image information about the operational area and provide operational and location commands to the tracking and command system.

27 Claims, 12 Drawing Sheets

U.S. PATENT DOCUMENTS

| | | | |
|---|---|---|---|
| 5,367,457 | A | 11/1994 | Ishida |
| 5,458,041 | A | 10/1995 | Sun et al. |
| 5,628,033 | A | 5/1997 | Dilich et al. |
| 5,781,437 | A | 7/1998 | Wiemer et al. |
| 5,864,360 | A * | 1/1999 | Okauchi et al. ............... 348/47 |
| 5,911,767 | A | 6/1999 | Garibotto et al. |
| 5,995,884 | A | 11/1999 | Allen et al. |
| 6,072,524 | A | 6/2000 | Davis et al. |
| 6,396,535 | B1 * | 5/2002 | Waters ........................ 348/159 |
| 6,438,456 | B1 | 8/2002 | Feddema et al. |
| 6,466,275 | B1 * | 10/2002 | Honey et al. ................. 348/722 |
| 6,597,143 | B2 | 7/2003 | Song et al. |
| 6,633,327 | B1 * | 10/2003 | Williams et al. .............. 348/82 |
| 6,694,228 | B2 | 2/2004 | Rios |
| 6,778,097 | B1 | 8/2004 | Kajita et al. |
| 6,811,113 | B1 | 11/2004 | Silansky et al. |
| 6,970,576 | B1 * | 11/2005 | Tilsley ........................ 382/103 |
| 7,023,913 | B1 * | 4/2006 | Monroe .................. 375/240.01 |
| 2003/0095688 | A1 * | 5/2003 | Kirmuss ..................... 382/105 |
| 2003/0227556 | A1 * | 12/2003 | Doyle ......................... 348/239 |

OTHER PUBLICATIONS

Chen et al.; Multisensor Based Autonomous Mobile Robot Through Internet Control; Nov. 1997; 23rd Intl. Conf. on Industrial Electronics, Control and Instrumentation; vol. 3, pp. 1248-1253.

* cited by examiner

MULTI-AGENT AUTONOMOUS SYSTEM

CROSS-REFERENCE TO RELATED APPLICATIONS

This application is a divisional of U.S. application Ser. No. 10/625,834, now U.S. Pat. No. 6,990,406, entitled "MULTI-AGENT AUTONOMOUS SYSTEM," filed Jul. 22, 2003, which claims the benefit of U.S. Provisional Patent Application No. 60/398,052, filed Jul. 22, 2002 and U.S. Provisional Patent Application No. 60/473,726, filed May 28, 2003, each of which are hereby incorporated by reference as if fully stated herein.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. 202) in which the contractor has elected to retain title.

BACKGROUND OF THE INVENTION

This invention relates generally to autonomous agents and more specifically to autonomous agents for exploration of hazardous or inaccessible locations.

Robotic reconnaissance operations are called for in potentially hazardous and/or inaccessible situations such as remote planetary surfaces. One approach to reconnaissance operations is to use a few sophisticated, expensive, highly capable and reasoning surface-based reconnaissance craft (e.g., rovers). In this case the reconnaissance mission is lost or adversely affected when one of the few robotic reconnaissance craft is damaged or destroyed because there is no redundancy.

In addition, rovers are spatially constrained in that they may only view a small portion of an explored area at a time. For example, as most rovers are tracked or wheeled surface-based craft, their elevation above the ground provides only a limited viewing range. Therefore, it is difficult for a rover to view a large enough area to make an intelligent decision about what features in an operational area are worthy of additional investigation.

The spatial constraint of a rover also causes difficulties when planning a path for the rover to follow when traveling through the operational area. As such, the rover may construct a locally optimal path through an operational area but not a globally optimal path because the rover may not be able to view a large enough area.

As an intelligent rover is expensive, both from the perspective of the capital cost to build and the resource cost to deploy and operate, only a single rover is typically deployed within an operational area. This means that any operational area is constrained to an area no larger than what a single rover can explore.

Finally, because loss of a single rover during an exploration mission may be catastrophic from the perspective of accomplishing an exploration mission's goals, there has been a reluctance within the robotics community to allow a rover to be truly autonomous. True autonomy means that a rover would be able to make its own decisions about where to go within an exploration space. If the logic controlling the operations of the rover is faulty, and the rover makes a decision that causes it to become inoperable, the mission may be lost. As such, most currently deployed rovers are not truly autonomous as they are at least partially controlled by teleoperation by a human.

Therefore, a need exists for a robotic reconnaissance system that uses inexpensive surface-based craft that are inexpensive enough, both in terms of capital cost and operational resources, that multiple surface-based craft can be deployed during a mission. Multiple surface-based craft provide redundancy in the case a surface-based craft is lost. In addition, multiple surface-based craft may explore a larger area than a single rover. Finally, as loss of one or more of the multiple surface-based craft will not destroy a mission, the robotic reconnaissance system may be allowed more autonomy in making decisions about what paths to take while exploring an area. Aspects of the present invention meet such need.

SUMMARY OF THE INVENTION

A multi-agent autonomous system for exploration of hazardous or inaccessible locations. The multi-agent autonomous system includes simple surface-based agents or craft controlled by an airborne tracking and command system. The airborne tracking and command system includes an instrument suite used to image an operational area and any craft deployed within the operational area. The image data is used to identify the craft, targets for exploration, and obstacles in the operational area. The tracking and command system determines paths for the surface-based craft using the identified targets and obstacles and commands the craft using simple movement commands to move through the operational area to the targets while avoiding the obstacles. Each craft includes its own instrument suite to collect surface-based information about the operational area that is transmitted back to the tracking and command system. The tracking and command system may be further coupled to a satellite system to provide additional image information about the operational area.

In one aspect of the invention, a method for controlling a surface-based craft within an operational area is provided. The method includes providing a tracking and command system coupled to the surface-based craft through a transceiver. The tracking and command system generates an image of an operational area and uses the image to generate a path for the surface-based craft. The tracking and command system then generates a set of craft commands for the surface-based craft using the path and transmits the craft commands to the surface-based craft via the transceiver. In response to the craft commands, the surface-based craft moves through the operational area.

In another aspect of the invention, generating a path for the surface-based craft further includes identifying the surface-based craft's position within the operational area and identifying a target by the tracking and command system using the image. The tracking and command system then determines a path between the craft's position and the target.

In another aspect of the invention, the surface-based craft further includes an instrument suite. Generating a path for the surface-based craft further includes collecting surface-based information from the instrument suite and transmitting the surface-based information from the craft to the tracking and command system. The tracking and command system may then generate a path for the surface-based craft using the surface-based information.

In another aspect of the invention, the tracking and command system is airborne. The tracking and command system may be supported by a lighter-than-air or a heavier-than-air aircraft. The lighter-than-air aircraft may be tethered or may include a thrust generating element.

In another aspect of the invention, the surface-based craft includes a proximity detector and a controller programmed to use signals from the proximity detector to avoid collisions.

In another aspect of the invention, a multi-agent autonomous system includes a tracking and command system having a transceiver, an operational area imager, a surface-based craft path planning module coupled to the operational area imager and the transceiver. The system further includes a plurality of surface-based craft coupled to the tracking and command system through the transceiver.

In another aspect of the invention, the multi-agent autonomous system further includes a surface-based craft position module and a reconnaissance target identification module coupled to the operational area imager and the path planning module.

In another aspect of the invention, the surface-based craft further include instrument suites.

In another aspect of the invention, the tracking and command system is airborne.

In another aspect of the invention, the tracking and command system includes a processor and a memory coupled to the processor. The memory is used to store program instructions executable by the processor. The program instructions include generating an image of an operational area; generating a path for the surface-based craft using the image; generating a set of craft commands for the surface-based craft using the path; and transmitting the craft commands to the surface-based craft via a transceiver.

In another aspect of the invention, the program instructions for generating a path for the surface-based craft further include identifying the surface-based craft's position within the operational area using the image, identifying a target using the image, and determining a path between the craft's position and the target.

In another aspect of the invention, the surface-based craft further includes an instrument suite and the program instructions for generating a path for the surface-based craft further include receiving surface-based information collected from the instrument suite by the craft, transmitting the surface-based information from the craft to the tracking and command system, and generating a path for the surface-based craft using the surface-based information and the image.

In another aspect of the invention, the surface-based craft further includes a proximity sensor, a drive mechanism, and a controller coupled to the proximity sensor and drive mechanism. The controller is programmed to avoid collisions using signals received from the proximity sensor.

In another aspect of the invention, a multi-agent autonomous system includes a self-propelled surface-based craft deployed in an operational area and a tracking and command system coupled to the plurality of surface-based craft. The tracking and command system includes an imager for generating an image of the operational area coupled to a path planner for planning a path for the surface-based craft using the image. A craft command generator uses the path to generate craft commands for use by a craft commander which transmits the craft commands to the surface-based craft In another aspect of the invention, the multi-agent autonomous system further includes a craft position determiner for determining the position and heading of the surface-based craft using the image and a reconnaissance target identifier for identifying targets using the image.

In another aspect of the invention, the surface-based craft further include instrument suites for collection of surface-based information.

In another aspect of the invention, the surface-based craft further include a proximity sensor for detecting an object in close proximity to the surface-based craft and a controller, responsive to the proximity sensor, for avoiding a collision with the object.

BRIEF DESCRIPTION OF THE DRAWINGS

These and other features, aspects, and advantages of the present invention will become better understood with regard to the following description, appended claims, and accompanying drawings where:

DETAILED DESCRIPTION

A multi-agent autonomous system includes numerous and redundant, specialized, low cost, expendable, sensor-equipped self-propelled surface-based reconnaissance craft, that collectively can cover vast expanses of terrain in a relatively short amount of time. Furthermore, in utilizing an overhead view, several significant mission advantages emerge, such as: enhanced surface-based craft safety (e.g., cliffs are visible long before the rover gets there); more efficient, air-controlled path planning for surface-based craft, thus increased mission science return; and enhanced control of surface-based craft traverses in unknown terrain.

An integrated air-ground multi-agent autonomous remote planetary surface exploration allows truly autonomous science exploration missions with air and ground-based agents in real environments. Furthermore, an overhead perspective allows for unprecedented safety of surface-based craft, i.e., non-traversable terrain (e.g., cliffs) is detected long before a surface-based craft gets there. Also, the overhead view allows for much more efficient path planning simply because more terrain is visible. This is particularly important when surface-based craft leave an operational area imaged during a descent onto a planetary surface. Optimized path planning leads to increased mission objective return. The advantage of having an overhead view reduces drastically the planning effort necessary to navigate the surface-based craft and thus allows for commanding multiple surface-based craft with almost no additional effort.

The multi-agent autonomous system can be applied to a variety of missions, such as: mine-sweeping operations; clean-up operations in hazardous environments (e.g., chemical plants, nuclear plants, etc.); scientific operations such as sample detection and sample return (e.g., search for meteorites in Antarctica); and military reconnaissance operations in hostile environments.

Figure 1A:
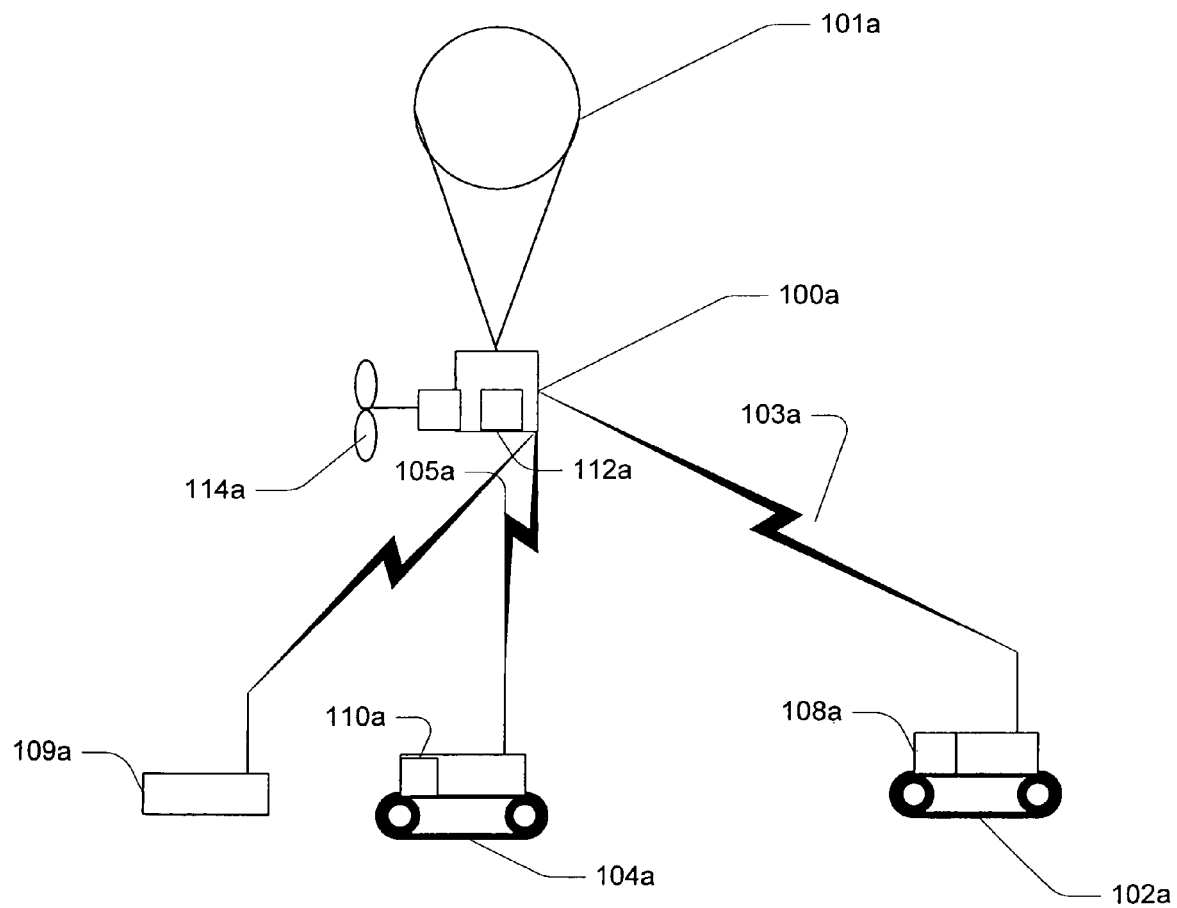
FIG. 1a is a block diagram of a multi-agent autonomous system in accordance with an exemplary embodiment of the present invention.

FIG. 1a is a block diagram of a multi-agent autonomous system in accordance with an exemplary embodiment of the present invention. A multi-agent autonomous system includes an air-borne tracking and command system 100a that may be held aloft by a support platform such as a lighter-than-air aircraft or balloon 101a. The tracking and command system is in communication with one or more surface-based craft or agents, such as craft 102a and 104a. Communications may be accomplished by radio control communications links 103a and 105a.

Each craft includes an instrument suite, such as instrument suites 108a and 110a that are used by the craft to obtain information about an environment or operational area that the craft are deployed in. For example the instrument suite may include an optical camera for taking images of an area immediately around each of the craft. Other imaging systems and instruments may be employed as well. The sensor signals from the instrument suite are transmitted by the craft to the tracking and command system.

The tracking and command system includes its own instrument suite 112a. The tracking and command system uses its instrument suite to take sensor readings of the craft and the environment surrounding the craft. For example, the tracking and command system's instrument suite may include an operational area imager such as an optical camera for capturing images of the craft environment and the craft within the environment.

In operation, the tracking and command system receives signals from its instrument suite including environment and craft signals indicating the position and heading of each craft in the environment. The tracking and command system uses the signals to generate a set of craft movement commands that are transmitted to the craft. The craft respond to the craft movement command signals by moving in the commanded manner through the environment. The tracking and command system also generates craft command signals commanding the craft to employ their own instrument suites to investigate objects or targets within their environment.

As the tracking and command system is airborne above the craft environment, the tracking and command system has a much larger field of view than the craft. As such, the tracking and command system may detect various obstacles and targets in the environment that the surface-based craft may not be able to detect. By having a larger field of view of the environment, the tracking and command system may select targets for exploration by the craft that the surface-based craft are unable to select simply because the surface-based craft cannot detect the potential target in the first place. In addition, the tracking and command system may use its larger field of view to more accurately determine a path for each craft around obstacles in the craft's environment.

The aircraft supporting the tracking and command system may further include a thrust generating element 114a for maneuvering the aircraft. Maneuvering the aircraft may be useful for both ensuring the aircraft remains in a desired area or for moving the multi-agent autonomous system to a new operational area. In addition, various forms of aircraft may be used as a platform for the tracking and command system. For example, the aircraft may be some other type of lighter-than-air aircraft such as a blimp. The aircraft may also be a heavier-than-air aircraft such as a glider, airplane, or helicopter.

In another tracking and command system support platform in accordance with an exemplary embodiment of the present invention, the platform is a tethered lighter-than-air aircraft. The aircraft may be tethered either directly to the surface, and thus fixed in place, or may be tethered to one of the surface-based craft. If tethered to one of the surface-based craft, the support platform and tracking and command system may travel to different locations along with the surface-based craft.

In another embodiment, the deployed agents may include one or more non-mobile sensors, such as sensor 109a, that are not self-propelled. These additional sensors may be used to augment or replace the surface-based information collected by the mobile surface-based craft.

Figure 1B:
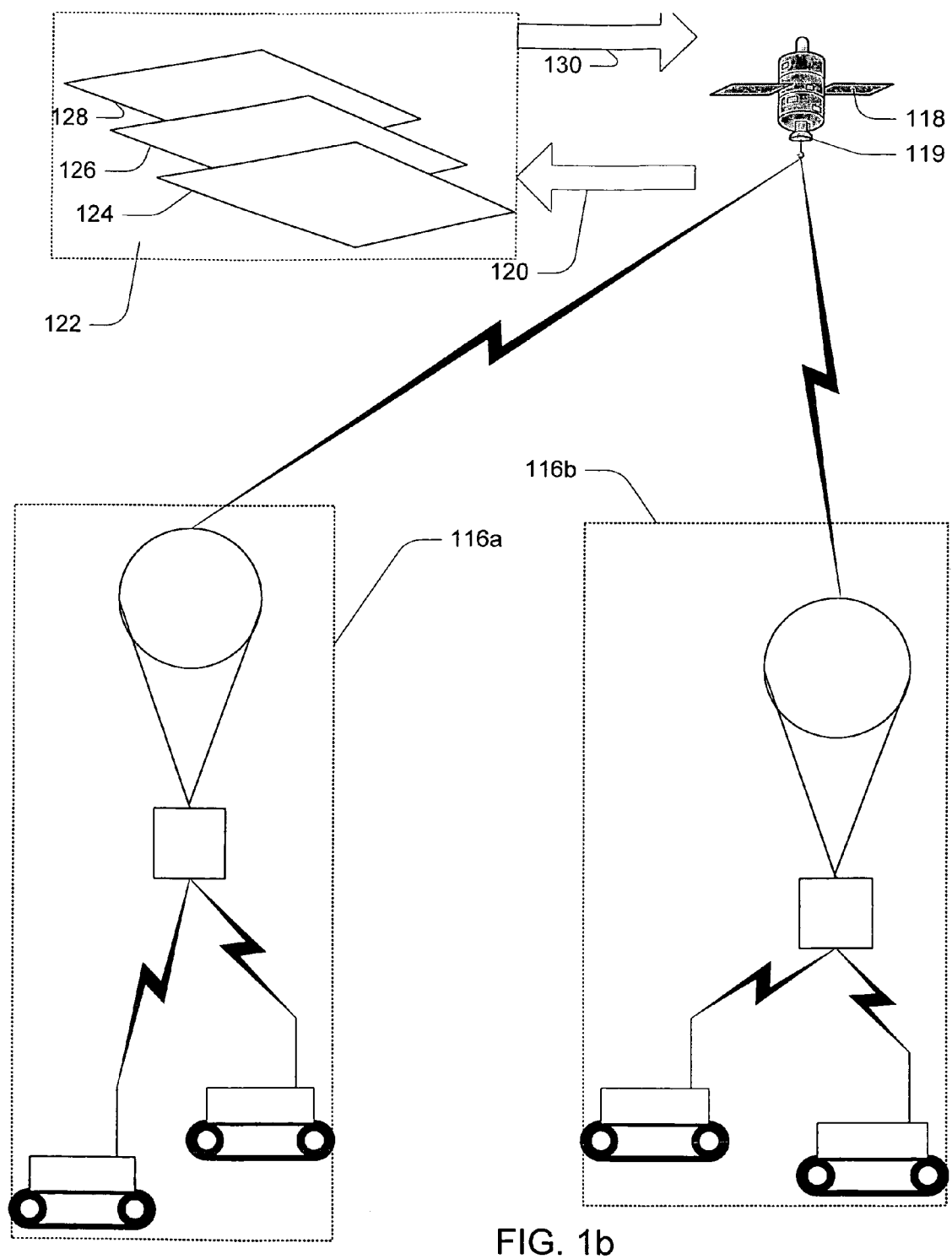
FIG. 1b is a block diagram illustrating the use of a multi-agent autonomous system to explore an area in accordance with an exemplary embodiment of the present invention.

FIG. 1b is a block diagram illustrating the use of a multi-agent autonomous system to explore an area in accordance with an exemplary embodiment of the present invention. One or more multi-agent autonomous systems, such as multi-agent autonomous systems 116a and 116b, may be coupled to a satellite 118 for exploration of a large area. The satellite may include its own instrument suite 119 for imaging the area being explored by the multi-agent autonomous systems. Information collected by the multi-agent autonomous systems and the satellite using its instrument suite is integrated 120 to generate a database 122 including views of the explored area generated by the various components of the exploration system. For example, information supplied by the surface-based craft 124 may include the detailed images of an operational area. However, since the surface-based craft have only a limited view, the actual area imaged by the surface-based craft may be small. Information supplied by the airborne tracking and command systems 126 may include images of a large portion of the explored area. However, as the airborne tracking and command systems are more elevated and further away from the explored area with respect to the surface-based craft, the information supplied by the tracking and command systems may be less detailed than the information collected by the surface-based craft. Information supplied by the satellite may include images from the entire explored area, but may not be as detailed as the information supplied by the tracking and command systems. By combining information from the components of the exploration system, a large area may be explored with a high level of detail.

Portions of the database of information may be transmitted 130 to the satellite and distributed to the coupled multi-agent autonomous systems. In this way, a multi-agent autonomous system may use information collected by the satellite or another autonomous system to aid in selection of targets to be explored by the surface-based craft.

Figure 2:
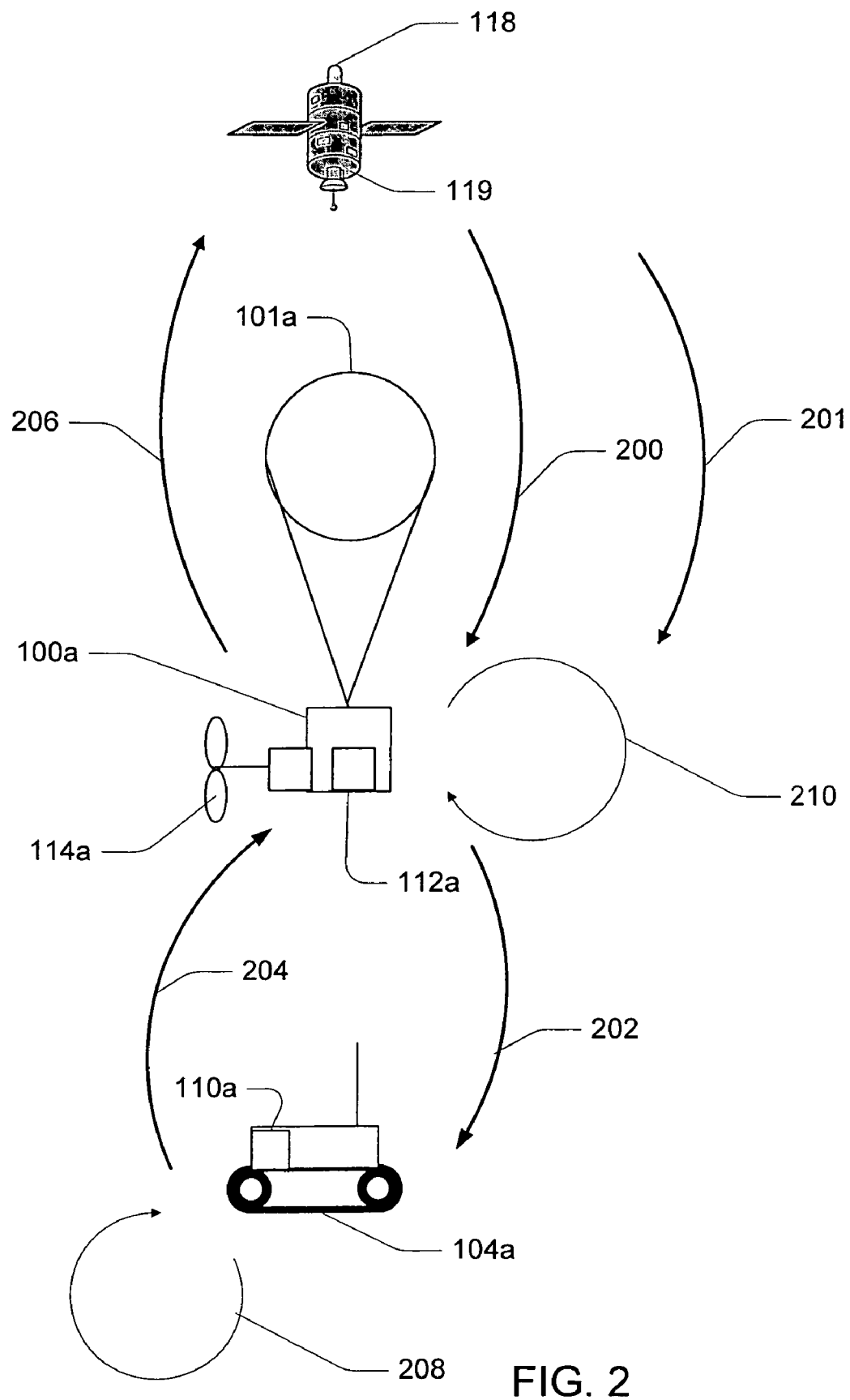
FIG. 2 is a block diagram illustrating communication links within a multi-agent autonomous system in accordance with an exemplary embodiment of the present invention.

FIG. 2 is a block diagram illustrating communication links within an exploration system using a multi-agent autonomous system in accordance with an exemplary embodiment of the present invention. A tracking and command system 100a receives an initiation signal 200 from a satellite 118. The tracking and command system may also receive information 201 about an area to be explored such as images generated by the satellite's instrument suite 119. In response to the initiation signal, the tracking and command system uses its own instrument suite 112a to image the area to be explored. The tracking and command system uses the information received from the satellite and its own imaging information to identify targets and obstacles in the area to be explored. Once the targets and the objects have been identified, the tracking and command system generates a path for a craft 104a to follow to get from the craft's current position to a target while avoiding any obstacles. The tracking and command system uses the path to generate and transmit craft command signals 202 to the craft. The craft responds to the command signals until it reaches a target. At the target, the craft uses its own instrument suite 110a to collect surface-based information about the target. The craft transmits the information about the target 204 to the tracking and command system. The tracking and command system in turn transmits its own imaging information as well as the craft's surface-based target information 206 to the satellite for integration into a database as previously described.

In addition to collecting information about targets and responding to craft commands from the tracking and command system, the craft may also use internal control logic to internally manage (208) collision avoidance. For example, the craft may include proximity sensors used to detect objects or other craft in its immediate vicinity. By using signals generated from the proximity sensors, the craft may avoid collisions with objects that the tracking and command system may not be able to detect. In a similar manner, the tracking and command system may generate (210) its own navigational commands in order to travel to a new area for exploration or maintain its position within an area of exploration.

As depicted, the multi-agent autonomous system is a multilayered and hierarchal system. For example, the surface-based craft constitute one layer, the tracking and command system constitutes another layer, and the satellite constitutes yet another layer. Each layer provides both information inputs from specific instrument suites and also includes computational elements. The exact distribution of the instrument suites, computational elements, and even the number of layers may be altered. For example, an extra airborne layer may be added to command the tracking and command system to relocate. In addition, the computations performed by the tracking and command system may be performed by a surface-based craft or base station. Finally, the satellite may be used to track and command the surface-based craft without having an intervening airborne instrumented or processing element.

Figure 3:
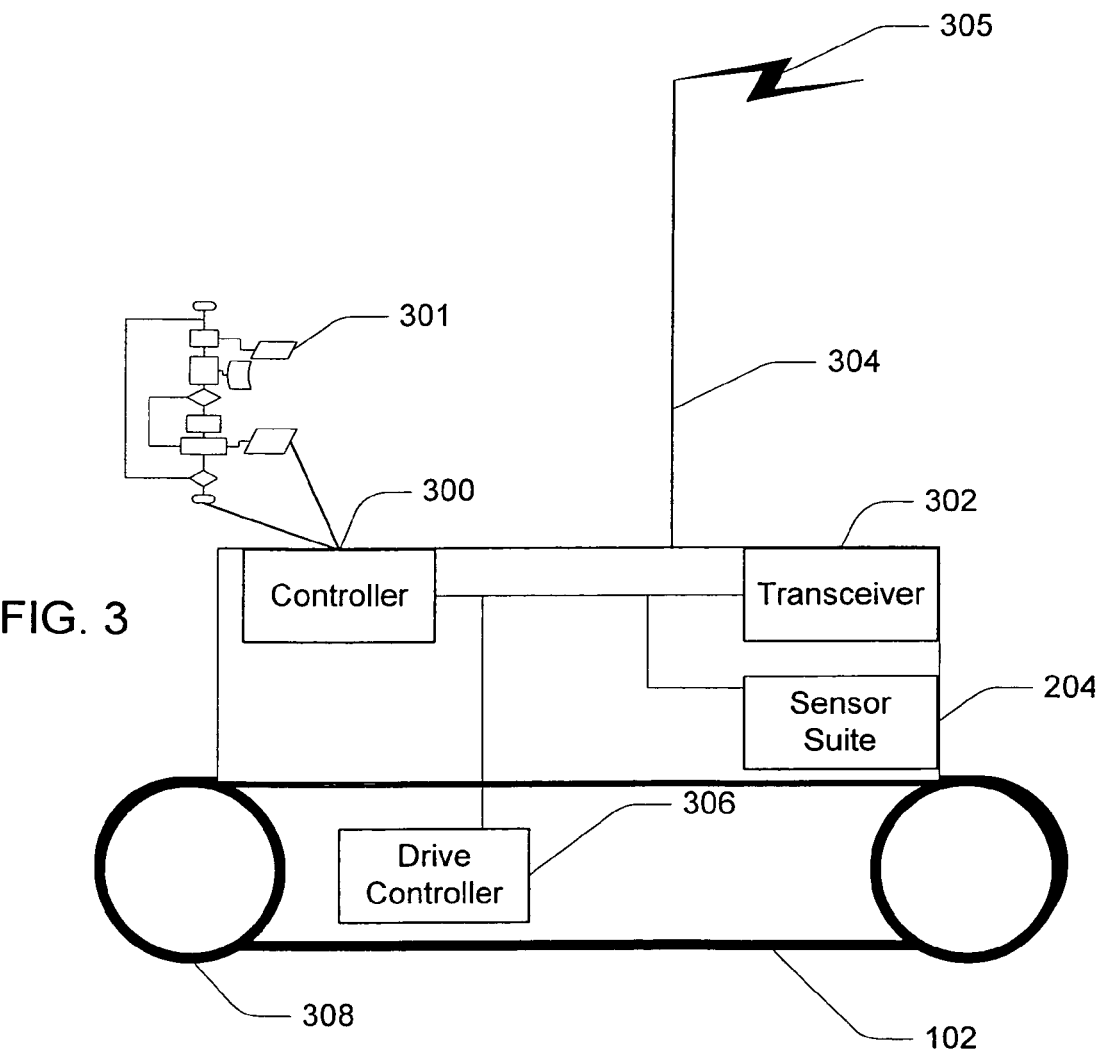
FIG. 3 is a block diagram of an agent or craft in accordance with an exemplary embodiment of the present invention.

FIG. 3 is a block diagram of a surface-based agent or craft in accordance with an exemplary embodiment of the present invention. A craft 102 includes a controller 300 having programming instructions 301 for controlling the operation of the craft. The controller is coupled to a transceiver 302 and antenna 304 for receiving and transmitting signals 305 from a tracking and command system. The controller is further coupled to an instrument suite 204 (or "sensor suite") used to analyze the craft's environment. The sensor suite may include imaging sensors such as video cameras for capturing images of the environment for transmission to the tracking and command system.

The instrument suite may further include proximity sensors used to sense objects or other craft in the immediate vicinity of the craft. The craft's controller may be programmed to use signals received from the proximity sensors to avoid collisions with obstacles or other craft.

The controller is further coupled to a drive controller 306 used to operate the craft's drive mechanism 308. In one surface-based craft in accordance with an exemplary embodiment of the present invention, the surface-based craft includes a tread drive mechanism. In other surface-based craft, the drive mechanism may include wheels, legs operable to move the craft, surface effect drives, etc. In addition, the surface-based craft may be operable on the surface of a body of water. Such a craft may be amphibious or be a boat or ship.

In one multi-agent autonomous system in accordance with an exemplary embodiment of the present invention, an individually addressable Radio Controlled (R/C) robot unit is used as a surface-based craft. The robot unit is supplied by Plantraco Ltd. of Saskatoon, Canada, and is known as a "Telecommander Desktop Sciencecraft".

Each Telecommander Desktop Sciencecraft system includes a sciencecraft unit and a Universal Serial Bus (USB)-controlled R/C commanding unit. A tracking and command system issues commands to the deployed sciencecraft via the USB-connected R/C control unit. Each sciencecraft operates on a unique R/C frequency.

In addition, the Telecommander Desktop Sciencecraft contains an integrated onboard color video camera. When the sciencecraft arrives at a destination, it can relay in-situ images of the target back to the tracking and command system for science analysis.

Figure 4:
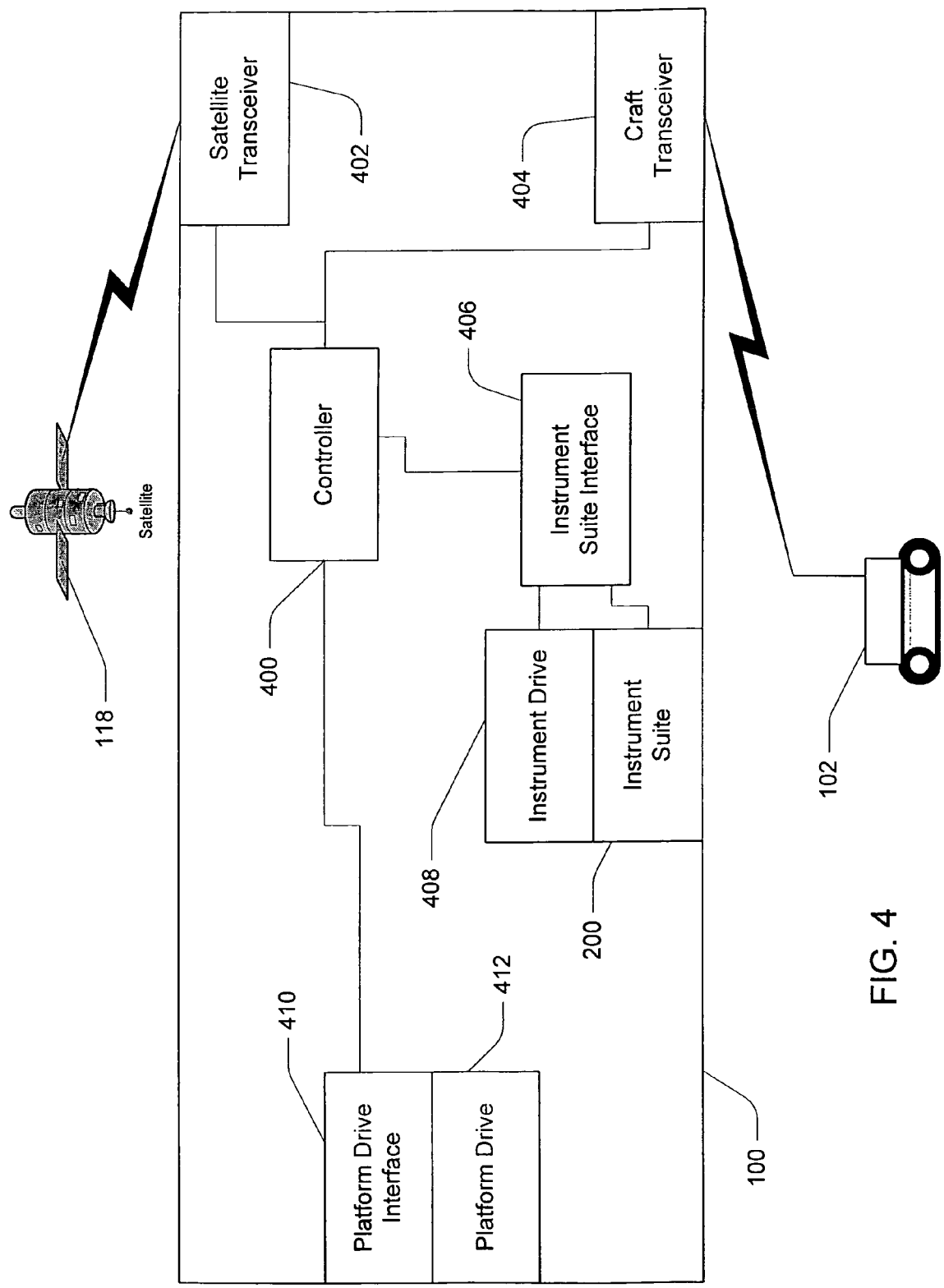
FIG. 4 is a block diagram of a craft tracking and command system in accordance with an exemplary embodiment of the present invention.

FIG. 4 is a block diagram of a craft tracking and command system in accordance with an exemplary embodiment of the present invention. A tracking and command system 100 includes a controller 400 for controlling the operations of the tracking and command system. The controller is coupled to a satellite transceiver 402 for communicating with a satellite 118. The controller is further coupled to a surface-based craft transceiver 404 used to communicate with a surface based craft 102. The controller is further coupled to an instrument suite interface 406. The controller uses the instrument suite interface to control the operations of an instrument drive 408 mechanically coupled to an instrument suite 200. The instrument drive may be used to aim, focus, and adjust the magnification of imaging sensors such as optical cameras. The instrument suite is electrically coupled to the instrument suite interface for use by the controller in collection of information used by the tracking and command system to track the surface-based craft and generate paths for the surface-based craft.

If the tracking and command system is mounted on a platform that is capable of transporting the tracking and command system between operational areas, the controller is further coupled to a platform drive interface 410. The platform drive interface is further coupled to a platform drive mechanism 412.

Figure 5:
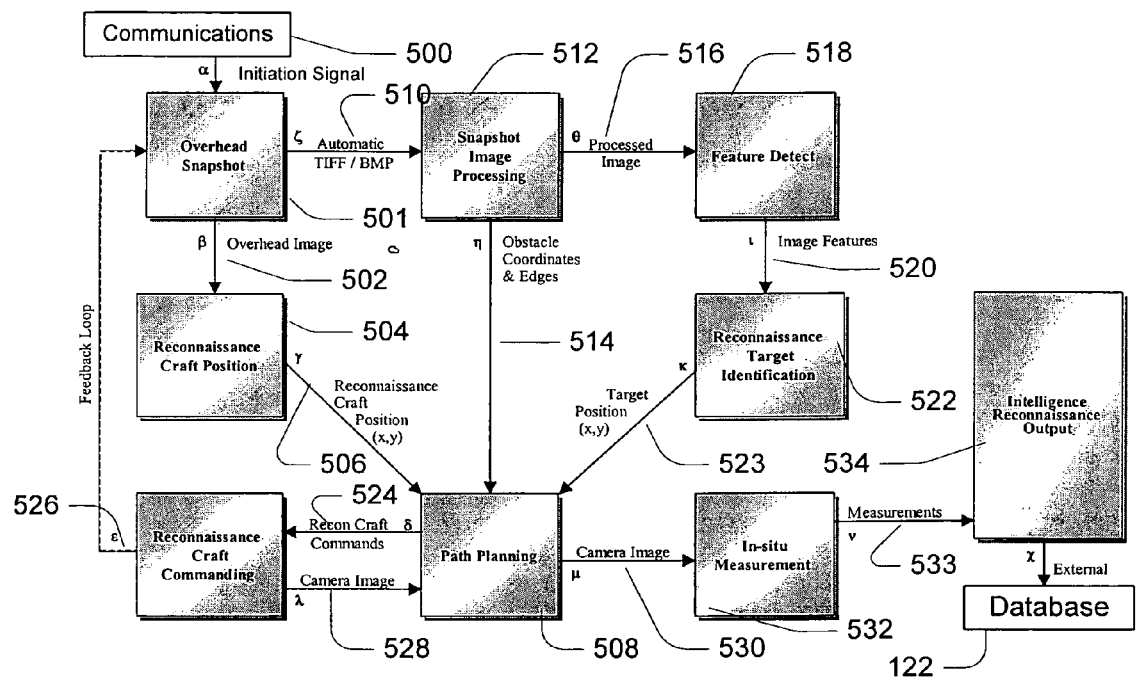
FIG. 5 is a software module diagram of a multi-agent autonomous system in accordance with an exemplary embodiment of the present invention.

FIG. 5 is a software module diagram of a multi-agent autonomous system in accordance with an exemplary embodiment of the present invention. The tracking and command system includes a communications module 500 for receiving commands from a satellite or other external system. Once an initiate signal is received, the tracking and command system uses an overhead image capturing module 501 to capture an image of an operational area. The image 502 is transmitted to a reconnaissance craft position module 504. The reconnaissance craft position module uses the image to determine the location and heading 506 of a surface-based craft in the area of operation. The image is further used by an imaging processing module 512 to identify any obstacles that may be in the area to be explored by generating a set of obstacle coordinates and outlines or edges 514. A processed image 516 from the image processing module is transmitted to a feature detection module 518. The feature detection module uses the processed image to demark image features 520 that are transmitted to a reconnaissance and target identification module 522. The reconnaissance and target identification module identifies features of interest in the operational area. Those features of highest interest are identified as targets and a set of target positions 523 is generated.

A path planning module 508 receives the reconnaissance craft location information 506, the obstacle location and edge information 514, and target positions 523. The path planning module uses this information to plan a path for the craft and generate a set of craft commands 524. The tracking and command system then uses a craft communication module 526 to transmit the craft commands to a craft.

The craft communication module is also used to receive transmissions from a craft. The transmissions may include information collected by the craft using the craft's own instrumentation suite, such as a camera image 528. This information is provided to the path planning module along with the information taken from the tracking and command system. The path planning module may use the craft instrument suite information to further refine the craft commands to be sent to the craft.

The software modules continuously process information received from the tracking and command system instrument suite and the craft instrument suite as indicated by feedback loop 526. This generates a constant stream of craft commands that are transmitted to the surface-based craft as they travel within the operational area.

The path planning module forwards the craft's instrument suite information 530 to an in-situ measurement module 532. The in-situ measurement module analyzes the information received from the surface-based craft and forwards the resultant measurements 533 to an intelligence reconnaissance output module 534. The intelligence reconnaissance output module transmits the craft information to external entities for integration into a previously described database 122 (of FIG. 1b).

Figure 6:
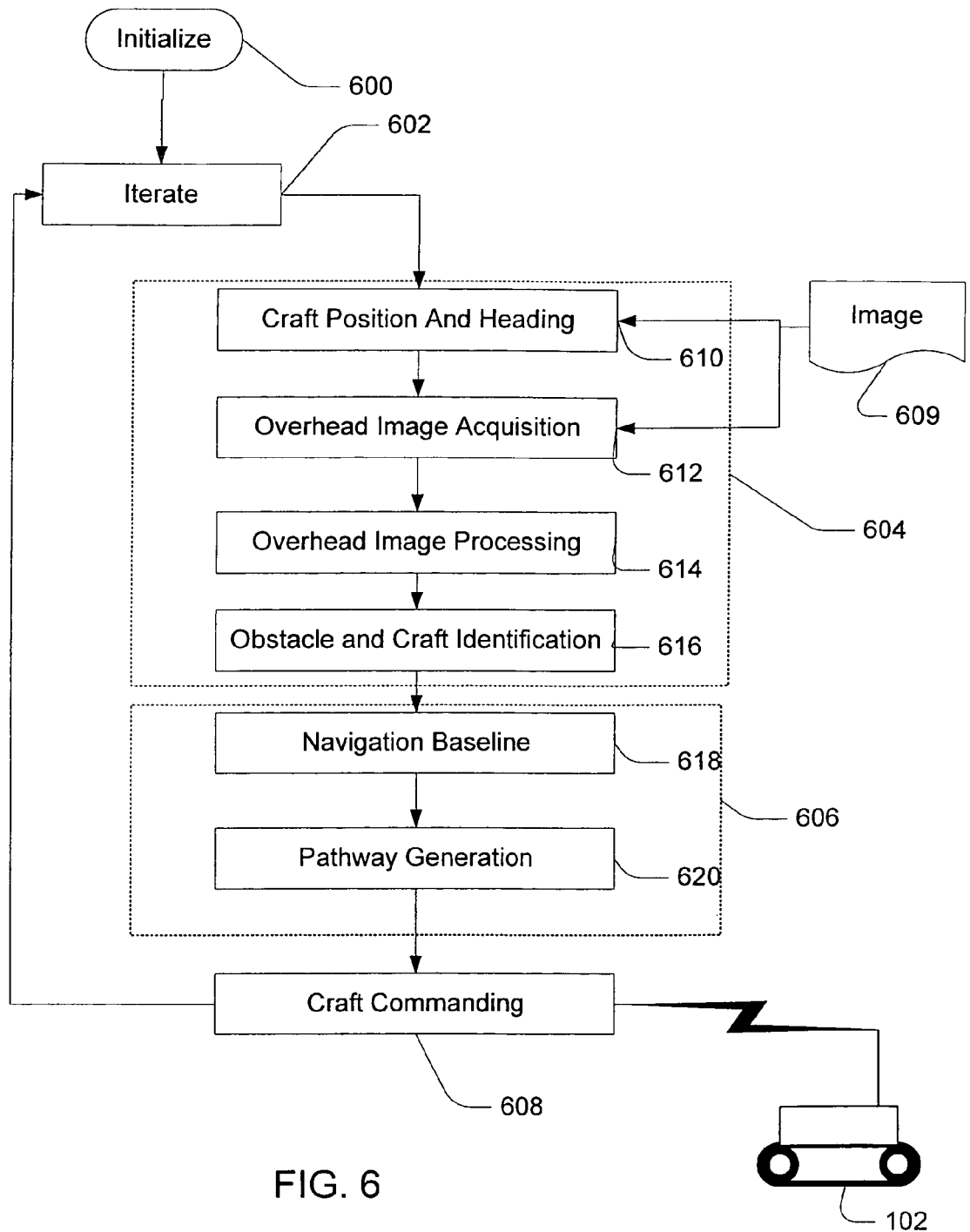
FIG. 6 is a process flow diagram for a multi-agent autonomous system in accordance with an exemplary embodiment of the present invention.

FIG. 6 is a process flow diagram for a multi-agent autonomous system in accordance with an exemplary embodiment of the present invention. The process flow diagram illustrates the processing sequence of the software modules of FIG. 5. A tracking and command system receives an exploration initiation signal 600 and iterates (602) the following sequence of operations. In a science and imaging process phase 604, the tracking and command system collects images about an operational area including surface-based craft deployed in the operational area. In a craft path determination phase (606) the tracking and command system determines a pathway to be followed by a craft in the operational area. In a craft command phase (608), the tracking and command system commands a craft 102 in such a way as the craft moves along a designated path between obstacles and towards a target. The process repeats iteratively 602 such that the craft follows a pathway to a target location.

In slightly more detail, the science and imaging process phase further includes receiving an image 609 of an operational area including images of any craft deployed in the operational area. The tracking and command system determines (610) from the image the location and heading of any craft in the operational area. The tracking and command system also acquires (612) the image and processes (614) the image to determine (616) obstacles and targets within the operational area.

During the craft path determination phase, the tracking and command system uses the obstacles, targets, and craft current position to determine (618) a navigation baseline for each craft deployed in the operational area. The tracking and command system then generates (620) a pathway for each craft to follow so that the craft may avoid the identified obstacles and reach a target.

Figure 7A:
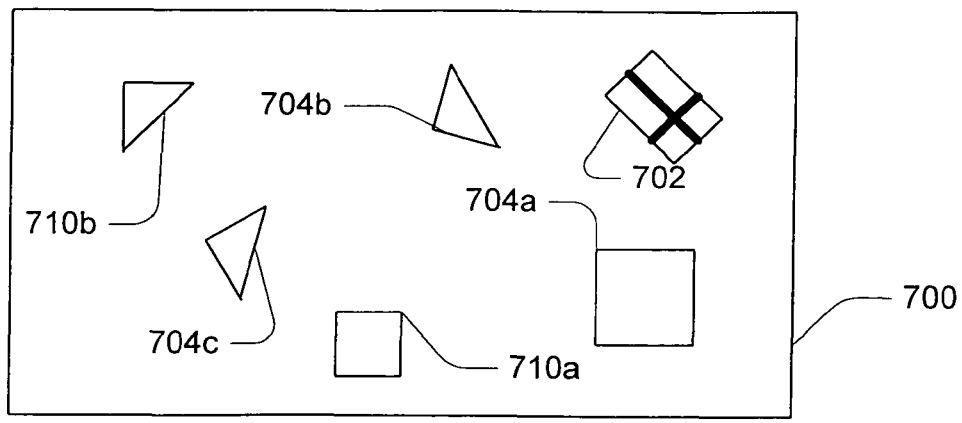
FIG. 7a is a block diagram of a craft imaged in an environment by a craft tracking and command system in accordance with an exemplary embodiment of the present invention.

FIG. 7a is a semi-schematic drawing of a craft imaged in an environment by a craft tracking and command system in accordance with an exemplary embodiment of the present invention. The image 700 includes an image taken of a craft 702. The craft includes markings or other indica that are visible to the tracking and command system's instrument suite. The markings may be used by the tracking and command system to determine a craft's heading. The image further includes images of obstacles, such as obstacles 704a, 704b, and 704c, that may impede the progress of the craft as the craft moves around within the imaged area. The image further includes images of targets, such as 710a and 710b, that the tracking and command system may determine are of interest. The tracking and command system will use the image to determine a path for the craft to take to reach the targets while avoiding the obstacles.

Figure 7B:
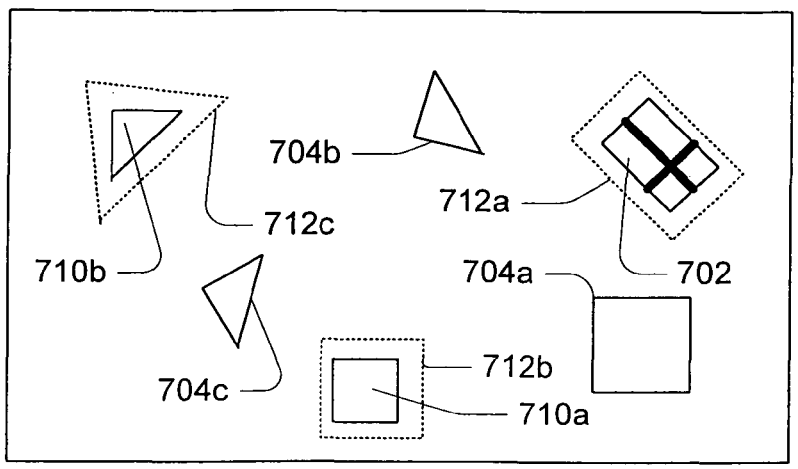
FIG. 7b is a block diagram of a craft, targets, and obstacles identified in an environment by a craft tracking and command system in accordance with an exemplary embodiment of the present invention.

FIG. 7b is a semi-schematic drawing of a craft, targets, and obstacles identified in an environment by a craft tracking and command system in accordance with an exemplary embodiment of the present invention. The tracking and command system identifies the craft 702 in the image by extracting features from the image and analyzing the features. Once the tracking and command system has identified the craft, as exemplified by the box 712a, the tracking and command system can determine the craft position. In addition, the tracking and command system uses the indicia on the craft to determine the heading of the craft.

The tracking and command system also separates other features within the image into obstacles and targets. A target may be separated from an obstacle by considering a feature space including the object's size, shape, albedo, surface irregularities, etc. Once an object has been identified as a target, as exemplified by box 712b around target 710a, the tracking and command system can determine the target's position. The tracking and command system continues processing features in the image to identify other targets, such as target 710b, as exemplified by triangle 712c. Other features identified by the tracking system, such as features 704a, 704b, and 704c, are identified as obstacles to be avoided by the craft.

Figure 7C:
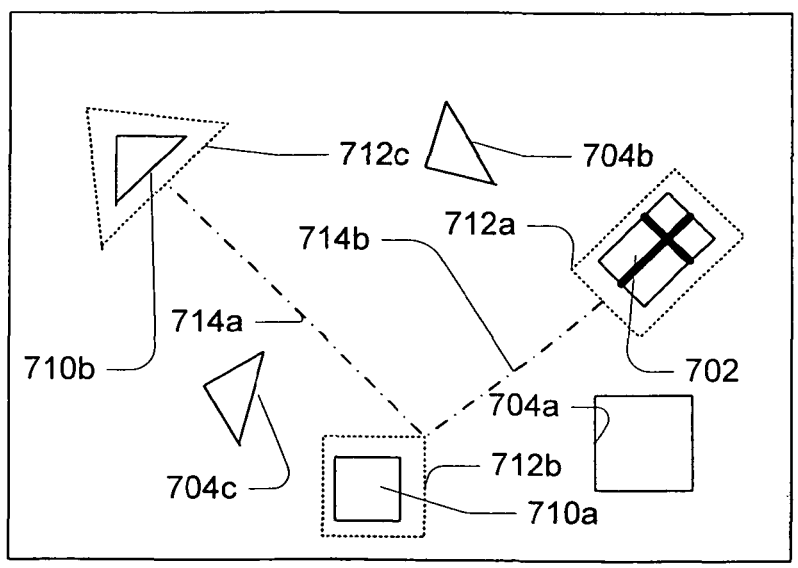
FIG. 7c is a block diagram of a planned craft path in accordance with an exemplary embodiment of the present invention.

FIG. 7c is a semi-schematic drawing of a planned craft path in accordance with an exemplary embodiment of the present invention. The craft is commanded by the tracking and command system to travel through the imaged operational area through a sequence of moves. For example, the craft 702 may be commanded to rotate a specified number of degrees in order to adjust its heading so that the craft is pointed toward its next target 710a. The craft is then commanded to travel a certain distance along its path, thus defining a segment 714b of a path. The path segment avoids obstacles 704a and 704b and takes the craft to its first target. When the craft arrives at the first target, the craft is then commanded to rotate and travel along path segment 714a to a second target 710b, while avoiding obstacle 704c. In this way, the craft is commanded to travel throughout an operational area, traveling from target to target without becoming obstructed by an obstacle. As the tracking and command system has information about a large area, it may intelligently command a craft through the large area without placing the craft into an untenable position.

Figure 8:
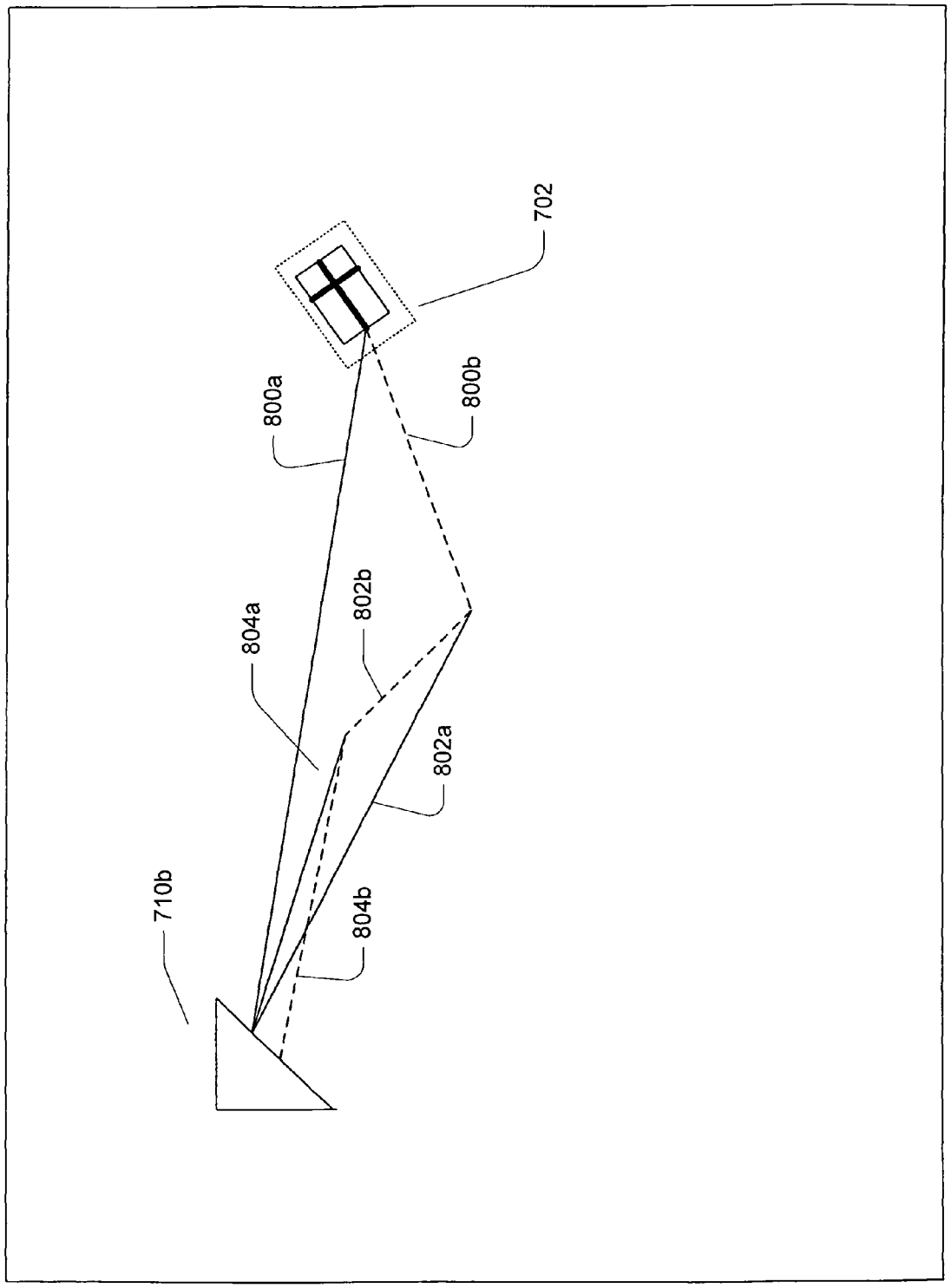
FIG. 8 is a block diagram depicting an iterative path planning sequence in accordance with an exemplary embodiment of the present invention.

FIG. 8 is a semi-schematic drawing depicting an iterative path planning sequence in accordance with an exemplary embodiment of the present invention. A craft 702 may be commanded to pass through an area to target 710b. As the tracking and command system may take a sequence of images in order to command the craft, the tracking and command system may issue a sequence of craft commands adjusting the craft's path through the environment in incremental steps. In this way, the multi-agent autonomous system may correct any errors that occur in the craft's progress. For example, the tracking and command system may command the craft to travel along path segment 800a. The tracking and command system issues a rotation command and a move forward command to the craft. As the craft moves forward, it may deviate from the desired path as indicated by segment 800b. In subsequent iterative steps, the tracking and command system takes images of the operational area and calculates additional segments for the path. For example, the tracking and command system may command the craft to rotate and follow path segment 802a only to discover that the craft has traveled along path segment 802b. Upon each iteration, the tracking and command system may issue commands guiding the craft along successive segments, such as 800a, 802a, and 804a, each time correcting the path of the craft when the tracking and command system determines that the craft has actually traveled along other path segments, such as 800b, 802b, and 804b. Thus, through successive craft commands, the tracking and command system guides the craft along successive path segments, resulting in the craft arriving at the desired target 710b.

Figure 9:
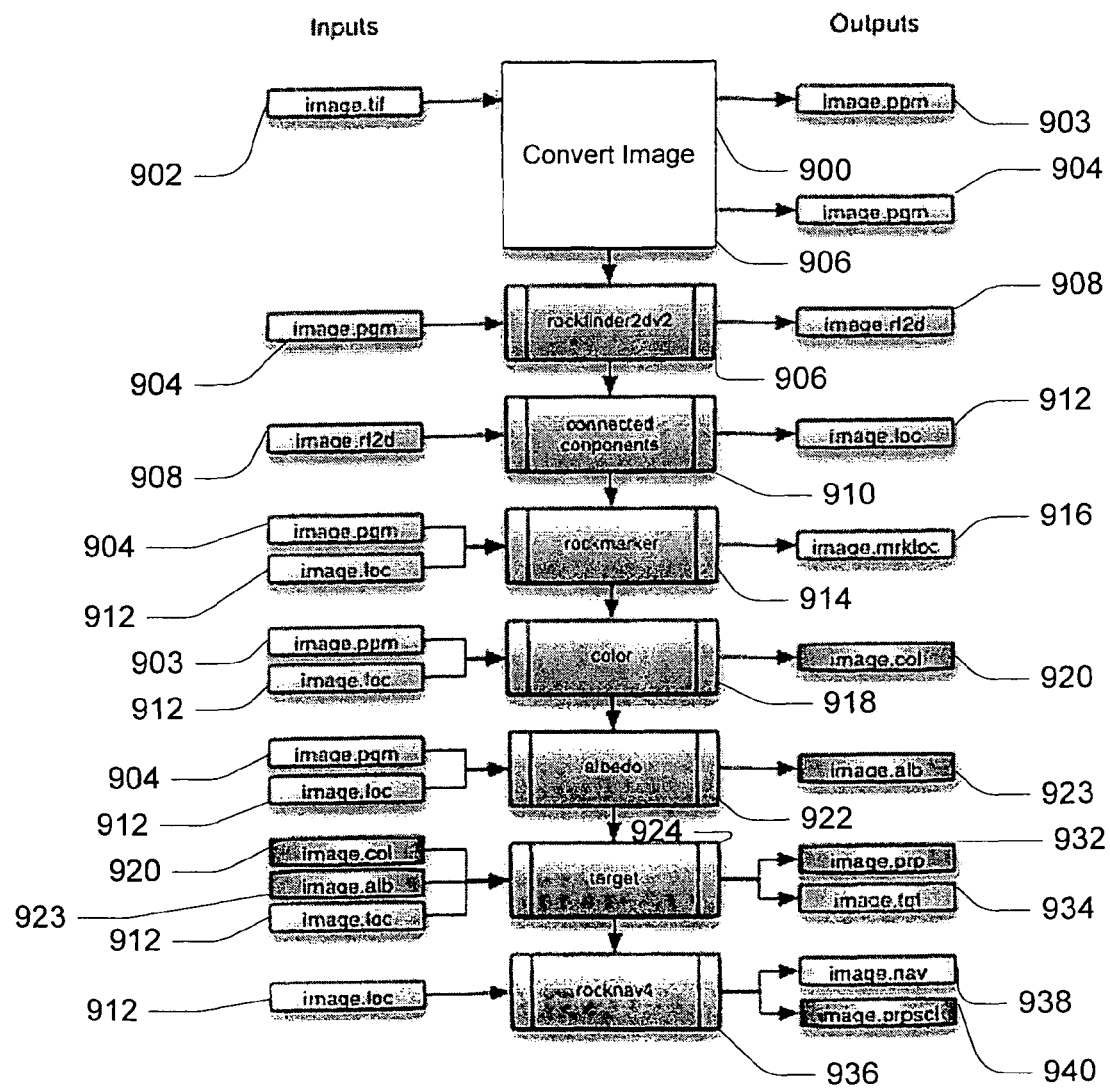
FIG. 9 is a process flow diagram of an image processing system in accordance with an exemplary embodiment of the present invention.

FIG. 9 is a process flow diagram of an image processing system in accordance with an exemplary embodiment of the present invention. A tracking and command system processes images from its instrument suite to determine a path for a craft. The tracking and command system does so by receiving an image and extracting information from the image in a sequence of passes, saving intermediate results in a temporary datastore. In a first pass, the tracking and command system converts (900) an input file image 902 into an image file 903 including color information and an image file 904 wherein the colors have been mapped to a grayscale. The tracking and command system then extracts (906) feature information 908 from the grayscale image file. The tracking and command system uses the feature information to identify (910) obstacles and targets and extract locations 912 of the obstacles and targets. The tracking and command system then uses the image file and the locations to generate (914) a mark feature file 916 of features that the tracking and command system may find to be interesting.

The tracking and command system next uses the image file and the location file to generate (918) a color file 920 wherein the color of each object, such as obstacles or targets, is indicated. The tracking and command system uses the image file and the location file to generate (922) an albedo file wherein the albedo of each object, such as obstacles or targets, is indicated.

The image file, color file, and albedo file are used by the tracking and command system to generate (924) a target image file 932 and a target file 934. The location file is finally used to generate (936) a navigation file 938 and a science target file 940 for use in determining a path for a craft.

Algorithms for extracting features from an image, including extracting the position and heading of a man-made object in a natural environment, are well known in the art of robotics. Each algorithm has its own advantages and weaknesses. As such, multi-agent autonomous systems in accordance with exemplary embodiments of the present invention may include different feature extraction algorithms dependent on the needs of a researcher or explorer. In one multi-agent autonomous system in accordance with an exemplary embodiment of the present invention, operational area analysis is performed by a suite of imaging processing programs entitled "Automated Geologic Field Analyzer" developed at the Jet Propulsion Laboratory of Pasadena, Calif. In addition, craft tracking is performed using a neural network using adaptive Radial Basis Functions (RBFs) for target recognition and tracking as described in "Real-time automatic target recognition using a compact 512×512 grayscale optical correlator, T. Chao, H. Zhou, G. F. Reyes, J. Hanan; Proceedings of SPIE Vol. #5106, the contents of which are hereby incorporated by reference as if stated fully herein.

Figure 10:
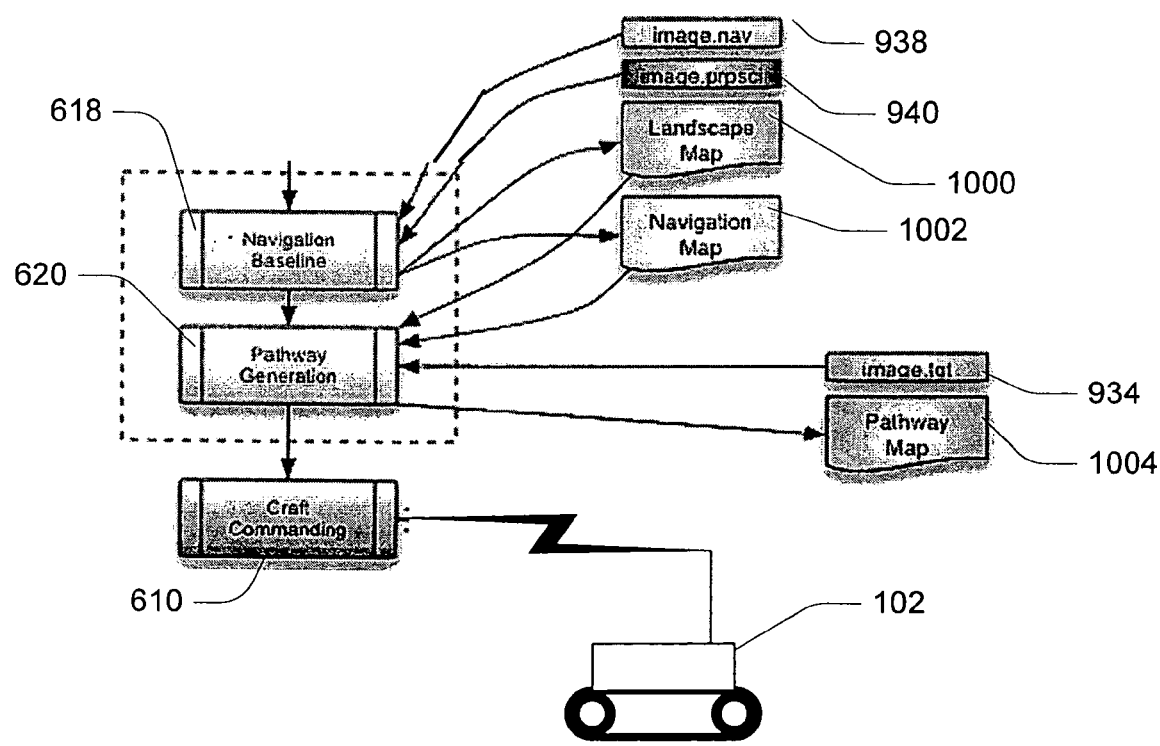
FIG. 10 is a process flow diagram of a craft command process in accordance with an exemplary embodiment of the present invention.

FIG. 10 is a process flow diagram of a craft command process in accordance with an exemplary embodiment of the present invention. A tracking and command system uses a craft command process to generate paths for craft deployed in an operational area. From the paths, specific craft commands are generated. To generate a path, a navigation baseline process 618 receives a navigation file 938 and science goal file 940 generated in the previously described image processing process of FIG. 9. The navigation baseline process generates a landscape map 1000 and a navigation map 1002. A pathway generation process 620 uses the landscape map, the navigation map, and the target file 934 to generate a pathway map 1004. From the pathway map, individual craft commands are generated that are transmitted to a craft 102 in a craft commanding process 610.

Algorithms for determining paths for a robot in an accurately characterized environment are well known in the art of robotics. Each algorithm has its own advantages and weaknesses. As such, multi-agent autonomous systems in accordance with exemplary embodiments of the present invention may include different path finding algorithms dependent on the needs of a researcher or explorer. In one multi-agent autonomous system in accordance with an exemplary embodiment of the present invention, path finding is performed using a line intersection method. Other algorithms may include weighted graph algorithms, the well-known A* method, etc.

Figure 11:
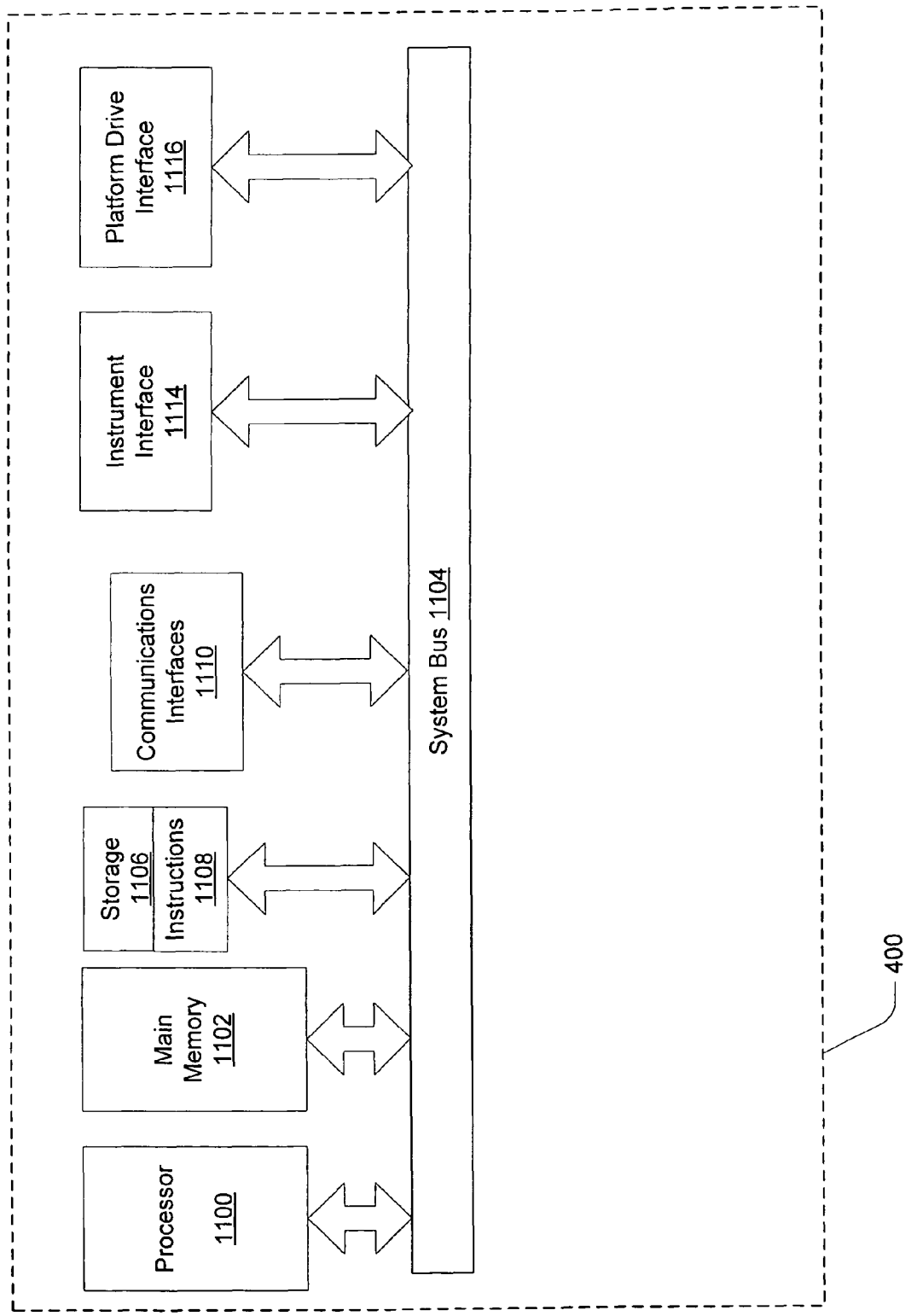
FIG. 11 is an architecture diagram of a data processing apparatus suitable for use as a craft tracking and command system in accordance with an exemplary embodiment of the present invention.

FIG. 11 is an architecture diagram of a data processing apparatus suitable for use as a craft tracking and command system controller in accordance with an exemplary embodiment of the present invention. The data processing apparatus 400 includes a processor 1100 coupled to a main memory 1102 via a system bus 1104. The processor is also coupled to a data storage device 1106 via the system bus. The storage device includes programming instructions 1108 implementing the features of a tracking and command system as described above. In operation, the processor loads the programming instructions into the main memory and executes the programming instructions to implement the features of the tracking and command system.

The data processing system may further include a plurality of communications device interfaces 1110 coupled to the processor via the system bus. A tracking and command system controller, hosted by the data processing system, uses the communications device interfaces to communicate with surface-bound craft or satellite as previously described.

The data processing system may further include an instrument interface 1114 coupled to the processor via the system bus. A tracking and command system controller, hosted by the data processing system, uses the instrument interface to generate control signals for a tracking and imaging instrument suite as previously described. In addition, the instrument interface is used by the tracking and command system controller to receive instrument suite sensor signals such as images of the operational area.

The data processing system may further include a platform drive interface 1116 coupled to the processor via the system bus. A tracking and command system controller, hosted by the data processing system, uses the platform drive interface to generate control signals for a platform supporting the tracking and command system.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of gathering and processing information from an area comprising:
    providing a first sensor with a first perspective of the area;
    providing a second sensor with a second perspective of the area;
    providing a processor in communication with the first sensor and the second sensor;
    sensing a first characteristic of the area with the first sensor to generate a first dataset;
    sensing a second characteristic of at least a portion of the area with the second sensor to generate a second dataset;
    generating a derived dataset by the processor integrating the first dataset and the second dataset; and
    detecting a feature in the area by analyzing one or more of the first dataset, the second dataset, or the derived dataset,
    wherein a level of detail of the second dataset is greater than a level of detail of the first dataset,
    wherein one of the first sensor or the second sensor is capable of moving in at least two dimensions relative to the other one of the first sensor or the second sensor, and
    wherein the feature comprises a location of one of the first sensor or the second sensor.

2. The method of claim 1, further comprising transmitting at least one of the first dataset, the second dataset, or the derived dataset to a remote location.

3. The method of claim 1, wherein at least one of the first dataset, the second dataset, or the derived dataset is imaging information.

4. The method of claim 1, wherein the first characteristic and the second characteristic are different.

5. The method of claim 1, wherein at least one of the first characteristic or the second characteristic includes shape information.

6. The method of claim 1, wherein the first perspective and the second perspective are different.

7. The method of claim 1, wherein at least one of the first perspective or the second perspective is a spatio-temporal perspective.

8. The method of claim 1, wherein the portion of the area is a smaller size than the area.

9. The method of claim 1, wherein the feature further comprises a target for investigation.

10. The method of claim 9, further comprising investigating the target.

11. The method of claim 1, wherein the feature further comprises an obstacle.

12. The method of claim 1, wherein the feature further comprises a directional heading of the one of the first sensor or the second sensor.

13. The method of claim 1, wherein the feature further comprises a velocity of the one of the first sensor or the second sensor.

14. The method of claim 1, wherein the other one of the first sensor or the second sensor is immobile.

15. The method of claim 1, further comprising comparing at least two of the first dataset, the second dataset, or the derived dataset.

16. A method of gathering and processing information from a first area and a second area comprising:
    providing a first sensor with a perspective of the first area;
    providing a second sensor with a perspective of the second area;
    providing a processor in communication with the first sensor and the second sensor;
    sensing a first characteristic of the first area with the first sensor to generate a first dataset;
    sensing a second characteristic of the second area with the second sensor to generate a second dataset; and
    generating a derived dataset by the processor integrating the first dataset and the second dataset,
    wherein the first sensor is capable of moving in at least two dimensions relative to the second sensor,
    wherein the derived dataset includes spatial information between the first dataset and the second dataset over time,
    wherein the second sensor is associated with a craft, and
    wherein the first sensor is capable of unconstrained movement relative to operation of the craft.

17. The method of claim 16, further comprising transmitting at least one of the first dataset, the second dataset, or the derived dataset to a remote location.

18. The method of claim 16, wherein a level of detail of the first dataset and a level of detail of the second dataset are different.

19. The method of claim 16, wherein at least one of the first dataset, the second dataset, or the derived dataset is imaging information.

20. The method of claim 16, wherein at least a portion of the first area and at least a portion of the second area overlap.

21. The method of claim 16, wherein the first characteristic and the second characteristic are different.

22. The method of claim 16, wherein the second sensor is immobile.

23. The method of claim 16, wherein at least one of the first characteristic or the second characteristic includes shape information.

24. The method of claim 16, further comprising comparing at least two of the first dataset, the second dataset, or the derived dataset.

25. A method of gathering and processing information from an area comprising:
    providing a first sensor with a first perspective of the area;
    providing a second sensor with a second perspective of the area;
    providing a processor in communication with the first sensor and the second sensor;
    sensing a first characteristic of the area with the first sensor to generate a first dataset;
    sensing a second characteristic of at least a portion of the area with the second sensor to generate a second dataset; and generating a derived dataset by the processor integrating the first dataset and the second dataset, wherein a level of detail of the second dataset is greater than a level of detail of the first dataset, wherein one of the first sensor or the second sensor is capable of moving in at least two dimensions relative to the other one of the first sensor or the second sensor, wherein the other one of the first sensor or the second sensor is associated with a craft, and wherein the one of the first sensor or the second sensor is capable of unconstrained movement relative to operation of the craft.

26. A method of gathering and processing information from an area comprising:

providing a first sensor with a first perspective of the area;

providing a second sensor with a second perspective of the area;

providing a processor in communication with the first sensor and the second sensor;

sensing a first characteristic of the area with the first sensor to generate a first dataset;

sensing a second characteristic of at least a portion of the area with the second sensor to generate a second dataset;

generating a derived dataset by the processor integrating the first dataset and the second dataset; and detecting a feature in the area by analyzing one or more of the first dataset, the second dataset, or the derived dataset, wherein a level of detail of the second dataset is greater than a level of detail of the first dataset, wherein one of the first sensor or the second sensor is capable of moving in at least two dimensions relative to the other one of the first sensor or the second sensor, and wherein the feature is a directional heading of one of the first sensor or the second sensor.

27. A method of gathering and processing information from an area comprising:

providing a first sensor with a first perspective of the area;

providing a second sensor with a second perspective of the area;

providing a processor in communication with the first sensor and the second sensor;

sensing a first characteristic of the area with the first sensor to generate a first dataset;

sensing a second characteristic of at least a portion of the area with the second sensor to generate a second dataset;

generating a derived dataset by the processor integrating the first dataset and the second dataset; and detecting a feature in the area by analyzing one or more of the first dataset, the second dataset, or the derived dataset, wherein a level of detail of the second dataset is greater than a level of detail of the first dataset, wherein one of the first sensor or the second sensor is capable of moving in at least two dimensions relative to the other one of the first sensor or the second sensor, and wherein the feature is a velocity of one of the first sensor or the second sensor.

* * * * *